United States Patent
Ito et al.

(10) Patent No.: US 10,906,239 B2
(45) Date of Patent: Feb. 2, 2021

(54) RESIN MATERIAL PLASTICIZING DEVICE AND RESIN MATERIAL PLASTICIZING METHOD

(71) Applicant: HONDA MOTOR CO., LTD., Tokyo (JP)

(72) Inventors: Haruka Ito, Tochigi-ken (JP); Daisuke Yamamoto, Tochigi-ken (JP); Shunichi Yorozuya, Tochigi-ken (JP); Yui Miyazaki, Tochigi-ken (JP); Fumitomo Takano, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 284 days.

(21) Appl. No.: 15/904,589

(22) Filed: Feb. 26, 2018

(65) Prior Publication Data

US 2018/0250880 A1    Sep. 6, 2018

(30) Foreign Application Priority Data

Mar. 1, 2017    (JP) .................. 2017-037868

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/118* (2017.08); *B29C 64/295* (2017.08);
(Continued)

(58) Field of Classification Search
CPC ... B29C 64/295; B29C 64/118; B29C 64/209; B29C 64/321
See application file for complete search history.

(56) References Cited

U.S. PATENT DOCUMENTS

| | | | |
|---|---|---|---|
| 6,004,124 A | 12/1999 | Swanson et al. | |
| 2014/0328963 A1* | 11/2014 | Mark ................ | B29C 64/20 425/143 |
| 2017/0072587 A1* | 3/2017 | La Forest ............ | B29C 70/38 |

FOREIGN PATENT DOCUMENTS

| | | |
|---|---|---|
| CN | 204076844 | 1/2015 |
| JP | 2002-500965 | 1/2002 |

(Continued)

OTHER PUBLICATIONS

JP2016531020 Translation (Year: 2016).*
(Continued)

*Primary Examiner* — Jacob T Minskey
*Assistant Examiner* — Adrien J Bernard
(74) *Attorney, Agent, or Firm* — Amin, Turocy & Watson LLP

(57) ABSTRACT

A resin material plasticizing device is equipped with a heating block in which a passage hole is formed to which there is supplied an elongate solid coating material, and which is capable of raising the temperature of an inner wall surface of the passage hole. At an upstream portion of the passage hole, so that an inner wall surface thereof is kept in contact with a side surface of the solid coating material, a cross section thereof which is perpendicular to an axial direction has a shape corresponding to the cross-sectional shape of the solid coating material. At least a part of the midstream portion is set in a manner so that a ratio of a circumferential length with respect to a cross-sectional area of a cross section perpendicular to the axial direction is greater than the same ratio of the upstream portion.

3 Claims, 9 Drawing Sheets

(51) Int. Cl.
*B33Y 10/00* (2015.01)
*B29C 64/118* (2017.01)
*B29C 64/295* (2017.01)
*B33Y 70/00* (2020.01)

(52) U.S. Cl.
CPC ............... *B33Y 10/00* (2014.12); *B33Y 30/00* (2014.12); *B33Y 70/00* (2014.12)

(56) References Cited

FOREIGN PATENT DOCUMENTS

| | | |
|---|---|---|
| JP | 2016-531020 | 10/2016 |
| WO | 2015/009938 | 1/2015 |

OTHER PUBLICATIONS

Japanese Office Action for Japanese Patent Application No. 2017-037868 dated Dec. 25, 2018.
Chinese Office Action and Search Report for Chinese Patent Application No. 201810172401.3 dated Nov. 1, 2019.

\* cited by examiner

RESIN MATERIAL PLASTICIZING DEVICE AND RESIN MATERIAL PLASTICIZING METHOD

CROSS-REFERENCE TO RELATED APPLICATION

This application is based upon and claims the benefit of priority from Japanese Patent Application No. 2017-037868 filed on Mar. 1, 2017, the contents of which are incorporated herein by reference.

BACKGROUND OF THE INVENTION

Field of the Invention

The present invention relates to a resin material plasticizing device and a resin material plasticizing method for plasticizing a solid resin material.

Description of the Related Art

As a three-dimensional printing method which enables a three-dimensional object to be obtained at a low cost with a simple configuration, a so-called fused deposition modeling method is known, in which plasticized (melted) resin filaments are laminated so as to be formed in a desired shape, and the laminated structure is solidified while maintaining the shape thereof. As disclosed, for example, in Japanese Laid-Open Patent Publication No. 2002-500965 (PCT), a three-dimensional printing apparatus in accordance with such a fused deposition modeling method includes a resin material plasticizing device that heats and plasticizes a solid filament.

More specifically, the resin material plasticizing device includes a thin-walled pipe having a constant inner diameter in the axial direction, and a heating block that covers an outer circumferential surface of the thin-walled pipe, and having a heating element disposed in the interior thereof. The thin-walled pipe can be brought to a temperature at which the interior thereof is capable of causing the solid filament to be plasticized, by exchanging heat with the heating block which is heated by the heating element. Therefore, when a solid filament is continuously supplied from one end side of the thin-walled pipe, the filament moves in the interior thereof while carrying out heat exchange with the thin-walled pipe, and the filament is continuously discharged in a plasticized state from the other end side of the thin-walled pipe.

SUMMARY OF THE INVENTION

Incidentally, in the above-described resin material plasticizing device, in order to increase the amount of the resin material to be plasticized per unit time and thereby enhance plasticizing efficiency, it may be considered to increase the diameter of the solid resin material and the inner diameter of the thin-walled pipe.

However, when the above-described diameter and the inner diameter are made larger, the distance between the inner circumferential surface of the thin-walled pipe and the axial center of the solid resin material is increased. Therefore, the time required for the heat of the thin-walled pipe to be thermally conducted to the entirety thereof including the interior of the filament is increased. In this case, since in order for heat to be conducted to the interior of the filament and sufficiently plasticize the filament, it is necessary to increase the length in the axial direction of the thin-walled pipe, there is a concern that the resin material plasticizing device will become large in scale.

A principal object of the present invention is to provide a resin material plasticizing device, which is capable of enhancing plasticizing efficiency of a resin material without increasing the size of the device.

Another object of the present invention is to provide a resin material plasticizing method, which similarly is capable of enhancing plasticizing efficiency of a resin material without increasing the size of the device.

According to an embodiment of the present invention, a resin material plasticizing device is provided, which is equipped with a heating block in which a passage hole is formed to which there is supplied an elongate solid resin material, and which is capable of raising temperature of an inner wall surface of the passage hole, wherein the solid resin material is heated in interior of the passage hole, and is discharged in a plasticized state, the passage hole comprising an upstream portion to which the solid resin material is configured to be supplied, a midstream portion to which the resin material, which has been heated and softened in the upstream portion, is configured to be supplied, and a downstream portion to which the resin material, which has been heated and plasticized in the midstream portion, is configured to be supplied from one end side thereof, and the resin material is discharged from another end side thereof, wherein, in the upstream portion, so that an inner wall surface thereof is kept in contact with a side surface of the solid resin material, a cross section perpendicular to an axial direction thereof has a shape corresponding to a cross-sectional shape perpendicular to an axial direction of the solid resin material, and in at least a part of the midstream portion, a ratio of a circumferential length with respect to a cross-sectional area of a cross section perpendicular to an axial direction is greater than a ratio of the upstream portion.

As described above, the resin material plasticizing device comprises the heating block in which the passage hole is formed through which the resin material is made to pass while being heated. In the upstream portion of the passage hole, a cross section thereof perpendicular to the axial direction (hereinafter, simply referred to as a cross section) has a shape corresponding to the cross-sectional shape of the solid resin material, and therefore, it is possible to efficiently carry out heat exchange by placing the heated inner wall surface of the upstream portion in contact with the side surface of the solid resin material. Consequently, the resin material can be softened quickly.

Further, the resin material, which has been softened in the upstream portion, is plasticized in the midstream portion. At least a part of the midstream portion is formed in a manner so that the ratio of a circumferential length with respect to a cross-sectional area of a cross section perpendicular to the axial direction is greater than the same ratio of the upstream portion. Since, as described above, the resin material supplied to the midstream portion is in a softened state, the resin material is deformed into the shape along the inner wall surface of the midstream portion. Owing to this feature, it is possible to increase the aforementioned ratio of the resin material, and more specifically, to make the resin material thin, and therefore, heat from the inner wall surface of the midstream portion can be conducted rapidly to the entirety of the resin material including the interior thereof. Accordingly, for example, as compared with a case of heating and plasticizing a resin material of the same volume but having a perfectly circular cross-sectional shape, it is possible to more efficiently discharge the plasticized resin material from the passage hole via the downstream portion.

As described above, in accordance with the resin material plasticizing device, without increasing the size of the device, it is possible to thermally conduct heat rapidly to the interior of the resin material, as well as to enhance the plasticizing efficiency of the resin material.

In the above-described resin material plasticizing device, in the midstream portion, the aforementioned ratio preferably becomes greater progressively from a side of the upstream portion toward a side of the downstream portion. In the midstream portion, as the resin material moves from the side of the upstream portion toward the side of the downstream portion, the heating time becomes longer and deformation of the resin material is facilitated. Therefore, by increasing the ratio of the midstream portion in the manner described above, it is possible to smoothly make the resin material thin. Further, as it becomes thinner, heat can be more efficiently conducted to the interior of the resin material. As a result, it is possible to further enhance the plasticizing efficiency of the resin material.

In the above-described resin material plasticizing device, the upstream portion and the midstream portion preferably are provided in plurality respectively, and the passage hole preferably further includes a reservoir portion, which is interposed between the plurality of the midstream portions and the downstream portion, and in which the resin material, which was plasticized in the plurality of the midstream portions, is merged together and stored. In this case, since a plurality of solid resin materials can be softened and heated simultaneously in the plurality of the upstream portions and the midstream portions, the plasticizing efficiency of the resin material can be further enhanced. Further, since the plasticized resin material can be stored in the reservoir portion before being discharged from the downstream portion, the entirety of the resin material can be uniformly set to a desired temperature. Stated otherwise, it becomes possible to stably discharge the resin material which has been suitably plasticized.

According to another embodiment of the present invention, a resin material plasticizing device is provided, which is equipped with a heating block in which a passage hole is formed to which there is supplied an elongate solid resin material, and which is capable of raising temperature of an inner wall surface of the passage hole, wherein the solid resin material is heated in interior of the passage hole, and is discharged in a plasticized state, the passage hole comprising an upstream portion to which the solid resin material is configured to be supplied, a midstream portion to which the resin material, which has been heated and softened in the upstream portion, is configured to be supplied, and a downstream portion to which the resin material, which has been heated and plasticized in the midstream portion, is configured to be supplied from one end side thereof, and the resin material is discharged from another end side thereof, wherein, in the upstream portion, so that an inner wall surface thereof is kept in contact with a side surface of the solid resin material, a cross section perpendicular to an axial direction thereof has a shape corresponding to a cross-sectional shape perpendicular to an axial direction of the solid resin material, and in at least a part of the midstream portion and the downstream portion, a cross-sectional shape thereof is configured to be set in a manner so that the resin material passes therethrough at a speed which is less than a speed at which the resin material passes through the upstream portion.

In the above-described resin material plasticizing device as well, since heat exchange can be carried out efficiently by placing the heated inner wall surface in the upstream portion in contact with the side surface of the solid resin material, the resin material can be softened quickly. Therefore, in the midstream portion and the downstream portion of the passage hole (hereinafter, collectively referred to as a "side downstream from the upstream portion"), the resin material is easily deformed so as to have a shape along the respective inner wall surfaces thereof.

Further, in the above-described resin material plasticizing device, at least a part of the side downstream from the upstream portion is formed with a cross-sectional shape that allows the resin material to pass therethrough at a speed which is less than the speed at which the resin material passes through the upstream portion. Owing to this feature, it is possible to reduce the speed at which the resin material is discharged from the passage hole, and to be lower than the speed at which the resin material is supplied to the passage hole. Stated otherwise, it is possible to increase the time during which the resin material remains in the passage hole, or in other words, to increase the time during which the resin material is heated by being brought into contact with the inner wall surface of the passage hole.

Therefore, in accordance with the resin material plasticizing device, without increasing the size of the device, it is possible to thermally conduct heat suitably to the interior of the resin material, as well as to enhance the plasticizing efficiency of the resin material.

In the above-described resin material plasticizing device, in at least a part of at least one of the midstream portion and the downstream portion, an area of a cross section perpendicular to the axial direction, and a ratio of a circumferential length with respect to the area preferably are configured to be greater than an area and a ratio of the upstream portion.

By increasing the cross-sectional area of at least a part of the side downstream from the upstream portion in comparison with the cross-sectional area of the upstream portion, it is possible to reduce the speed at which the resin material passes through the side downstream from the upstream portion, as compared with the speed at which the resin material passes through the upstream portion.

Further, by setting the ratio in the manner described above, when the resin material passes through the side downstream from the upstream portion, resistance is easily received from the inner wall surface, more so than when the resin material passes through the upstream portion. Owing to this feature as well, it is possible to reduce the speed at which the resin material passes through the side downstream from the upstream portion, in comparison with the speed at which the resin material passes through the upstream portion.

As a result, at least a part of the side downstream from the upstream portion can easily be formed with the above-described cross-sectional shape.

According to another embodiment of the present invention, a resin material plasticizing method is provided for heating and plasticizing an elongate solid resin material while the resin material is made to pass through a passage hole disposed in a heating block, comprising a softening step of softening the solid resin material in an upstream portion of the passage hole, a plasticizing step of increasing a ratio of a circumferential length with respect to a cross-sectional area of a cross section perpendicular to an axial direction of the resin material, and thereby plasticizing the softened resin material in a midstream portion of the passage hole, and a discharging step of discharging the plasticized resin material from a downstream portion of the passage hole.

In the above-described resin material plasticizing method, the solid resin material, which is softened by the softening step, is heated and plasticized in a state of being deformed by the plasticizing step in a manner so that the aforementioned ratio increases. With the resin material in which the aforementioned ratio is increased, or stated otherwise, in which the resin material is made thin, heat from the inner wall surface of the midstream portion can be thermally conducted rapidly to the entirety of the resin material including the interior thereof. Therefore, by the discharging step, it is possible for the resin material, the entirety of which has been plasticized efficiently, to be discharged from the downstream portion.

As described above, in accordance with the resin material plasticizing method, without increasing the size of the device that plasticizes the resin material, it is possible to thermally conduct heat rapidly to the interior of the resin material, as well as to enhance the plasticizing efficiency of the resin material.

In the above-described resin material plasticizing method, in the plasticizing step, the resin material is preferably plasticized while the ratio becomes greater progressively from one end side of the midstream portion to which the resin material is supplied toward another end side thereof that discharges the resin material. In this case, in the plasticizing step, it is possible for the resin material to smoothly be made thin, and to efficiently conduct heat to the interior of the resin material. Therefore, the plasticizing efficiency of the resin material can be further enhanced.

In the above-described resin material plasticizing method, the upstream portion and the midstream portion preferably are provided in plurality respectively. In the softening step, the solid resin material preferably is supplied to each of the plurality of the upstream portions, and in the plasticizing step, the resin material preferably is plasticized in each of the plurality of the midstream portions and softened. Additionally, in the discharging step, the resin material, which was plasticized in the plurality of the midstream portions, preferably is merged together, and is stored in a reservoir portion which is interposed between the plurality of the midstream portions and the downstream portion, and the resin material preferably is discharged from the reservoir portion via the downstream portion.

In this case, since a plurality of solid resin materials can be softened and heated simultaneously, the plasticizing efficiency of the resin material can be further enhanced. Further, by storing the plasticized resin material in the reservoir portion, the entirety of the resin material can be uniformly set to a desired temperature. As a result, it becomes possible to stably discharge the resin material which has been suitably plasticized.

According to another embodiment of the present invention, a resin material plasticizing method is provided for heating and plasticizing an elongate solid resin material while the resin material is made to pass through a passage hole disposed in a heating block, comprising a softening step of softening the solid resin material in an upstream portion of the passage hole, a plasticizing step of plasticizing the softened resin material in a midstream portion of the passage hole, and a discharging step of discharging the plasticized resin material from a downstream portion of the passage hole, wherein at least one of a speed at which the resin material passes through the midstream portion, and a speed at which the resin material passes through the downstream portion is less than a speed at which the resin material passes through the upstream portion.

In the resin material plasticizing method, due to the resin material being softened by the softening step, it is possible for the resin material to pass through the passage hole, while the resin material undergoes deformation in at least one of the plasticizing step and the discharging step. Therefore, by at least one of the speed at which the resin material passes through the midstream portion and the speed at which the resin material passes through the downstream portion being less than the speed at which the resin material passes through the upstream portion, it is possible to reduce the speed at which the resin material is discharged from the passage hole, and to be lower than the speed at which the resin material is supplied to the passage hole. As a result, it is possible to increase the time during which the resin material remains in the passage hole, or in other words, to increase the time during which the resin material is heated by being brought into contact with the inner wall surface of the passage hole.

As described above, in accordance with the resin material plasticizing method, without increasing the size of the device that plasticizes the resin material, it is possible to thermally conduct heat suitably to the interior of the resin material, as well as to enhance the plasticizing efficiency of the resin material.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a resin material plasticizing device and a resin material plasticizing method according to the present invention will be described in detail below with reference to the accompanying drawings.

The resin material plasticizing device according to the present invention is a device for plasticizing a solid resin material, and the supply destination and usage of the resin material, which has been plasticized by the resin material plasticizing device, are not particularly limited.

Figure 1:
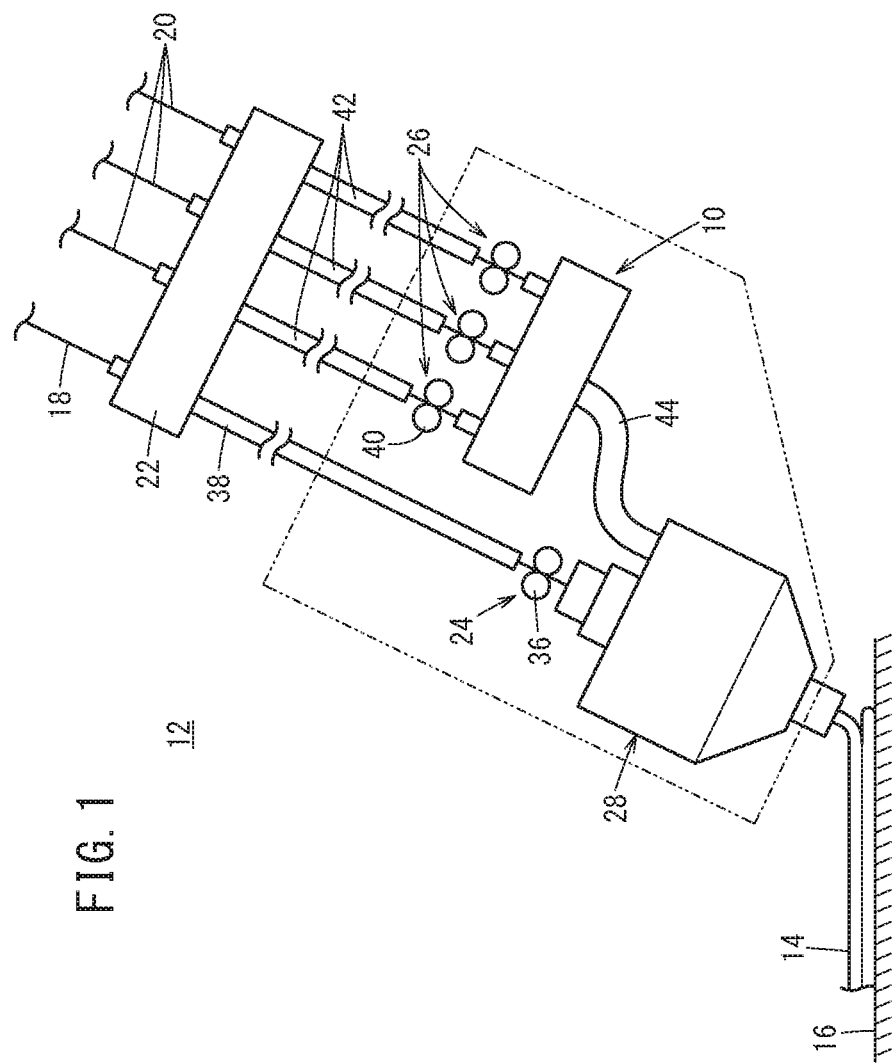
FIG. 1 is a schematic view of main components of a three-dimensional printing apparatus equipped with a resin material plasticizing device according to an embodiment of the present invention.

As shown in FIG. 1, according to the present embodiment, a case in which a resin material plasticizing device 10 constitutes a three-dimensional printing apparatus 12 will be presented and described as an example. In such a three-dimensional printing apparatus 12, filaments 14 are laminated on a stage 16 to thereby manufacture a three-dimensional object (not shown).

Figure 6A:
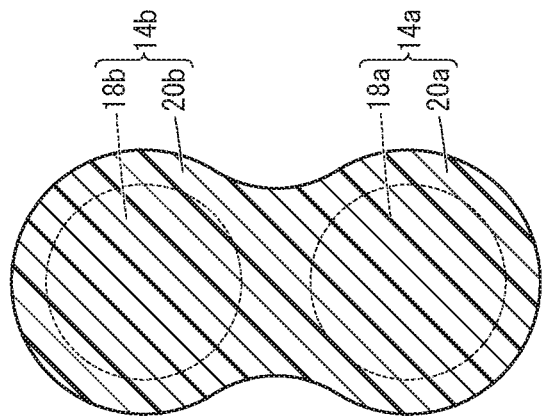
FIGS. 6A to 6C are explanatory diagrams illustrating a process of laminating and integrating filaments discharged from the nozzle of FIG. 4.
Figure 6B:
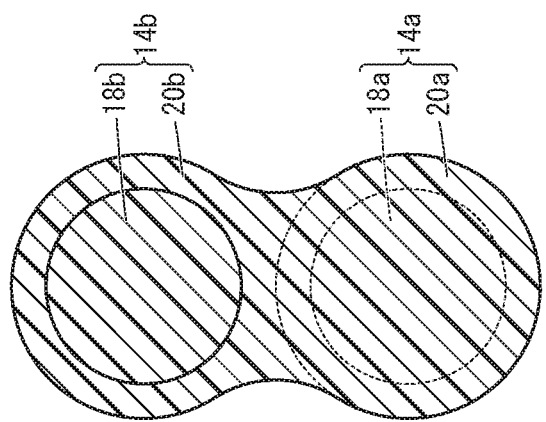
Figure 6C:
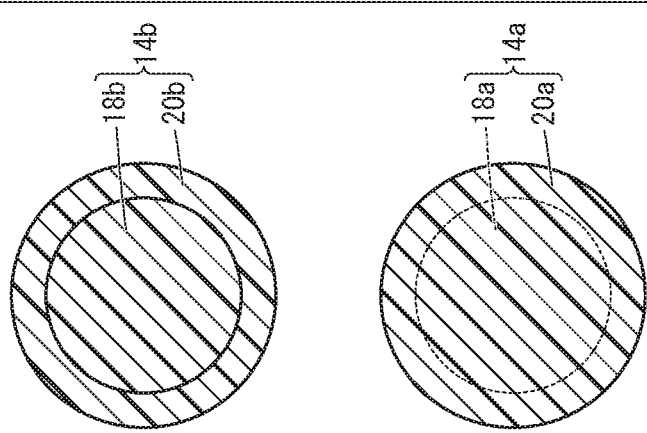
Figure 7B:
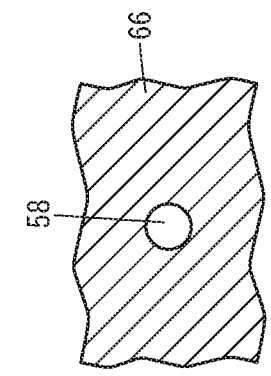
FIG. 7B is a cross-sectional view taken along line VIIB-VIIB of FIG. 7A.
Figure 7C:
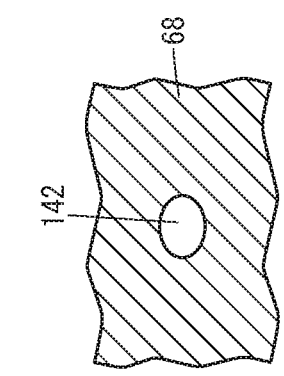
FIG. 7C is a cross-sectional view taken along line VIIC-VIIC of FIG. 7A.
Figure 7D:
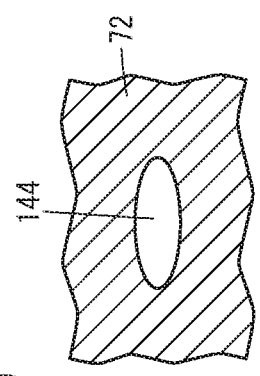
FIG. 7D is a cross-sectional view taken along line VIID-VIID of FIG. 7A.
Figure 7A:
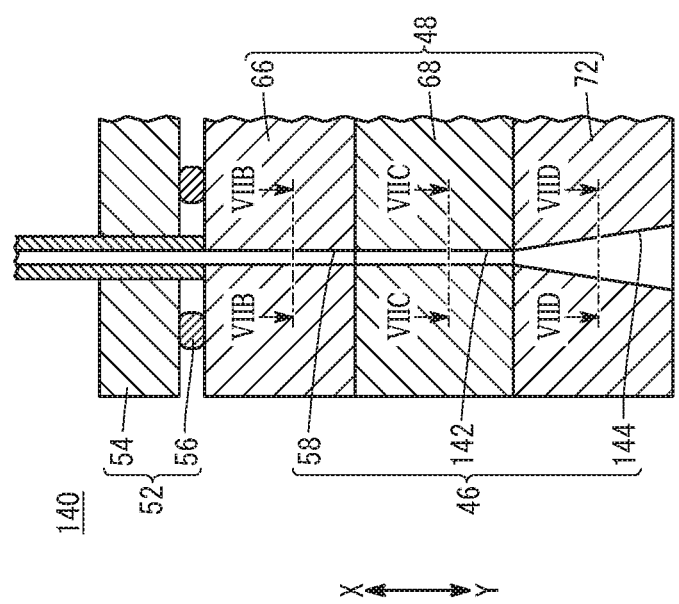
FIG. 7A is a partial cross-sectional view of a resin material plasticizing device according to another embodiment of the present invention.
Figure 8B:
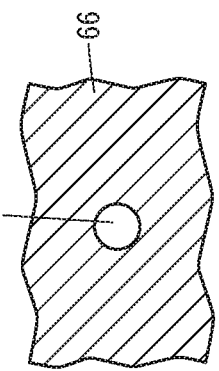
FIG. 8B is a cross-sectional view taken along line VIIIB-VIIIB of FIG. 8A.
Figure 8C:
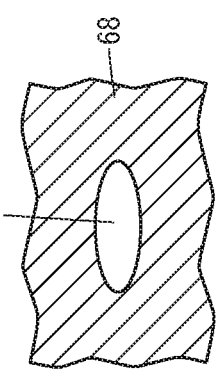
FIG. 8C is a cross-sectional view taken along line VIIIC-VIIIC of FIG. 8A.
Figure 8D:
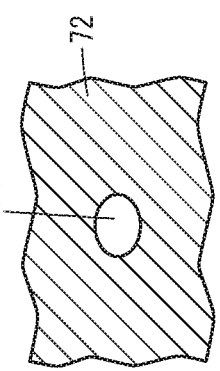
FIG. 8D is a cross-sectional view taken along line VIIID-VIIID of FIG. 8A.
Figure 8A:
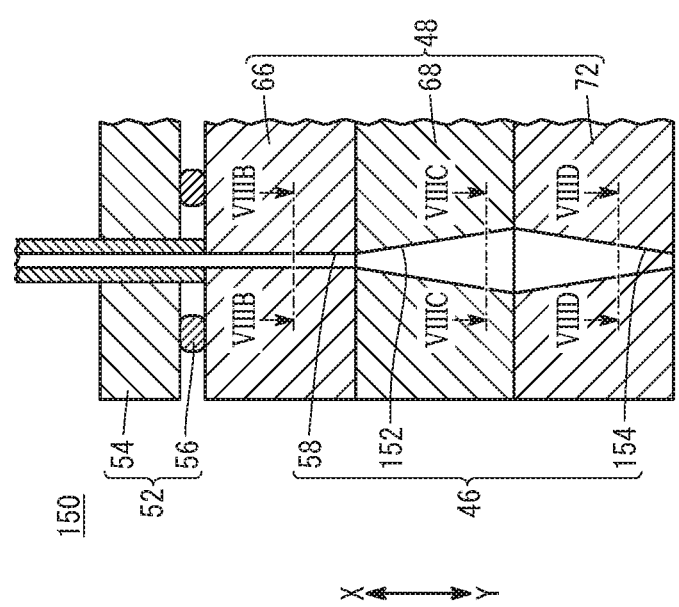
FIG. 8A is a partial cross-sectional view of a resin material plasticizing device according to yet another embodiment of the present invention.

As shown in FIGS. 6A to 6C, the filaments 14 are made of a thermoplastic resin such as acrylonitrile-butadiene-styrene (ABS) or polylactic acid (PLA), and include a core material 18 (18a, 18b), and a coating material 20 (20a, 20b) (resin material) that is adhered to the outer circumferential surface of the core material 18. Moreover, the core material 18 and the coating material 20 may be constituted from different types of resins, or may be constituted from the same type of resin.

Figure 5:
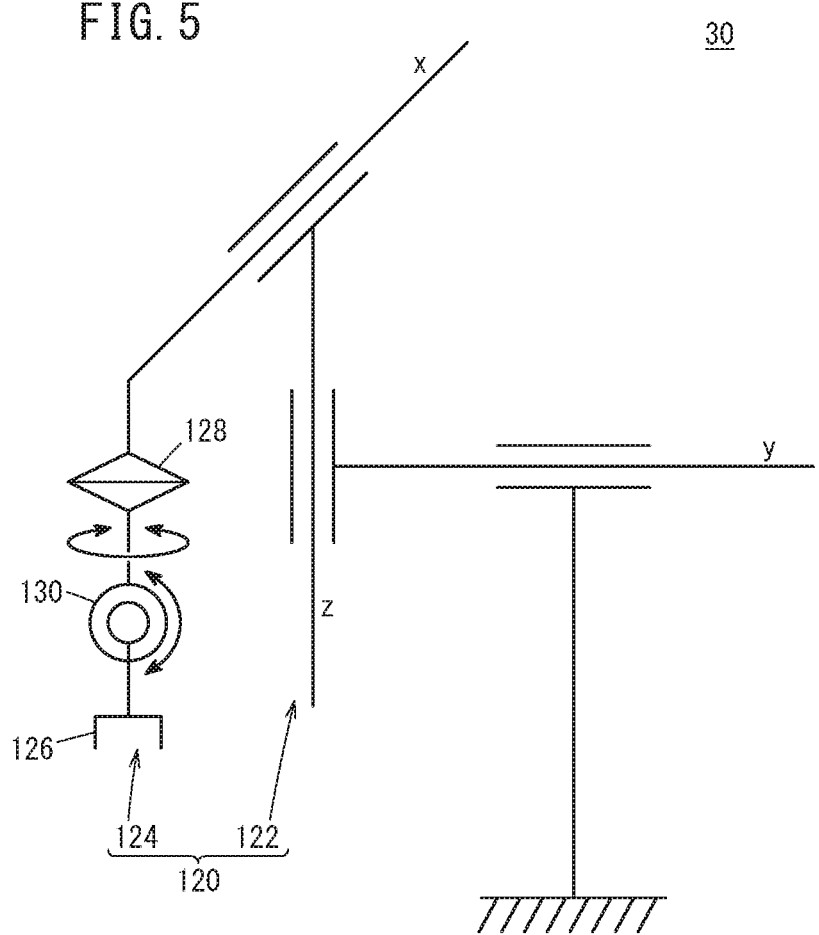
FIG. 5 is a symbolic diagram of a robot that constitutes a moving device of the three-dimensional printing apparatus.

More specifically, the three-dimensional printing apparatus 12 includes, in addition to the resin material plasticizing device 10, a core material heating device 22, a core material conveying device 24, a coating material conveying device 26, a nozzle 28, and a moving device 30 (see FIG. 5).

The core material heating device 22 is made up from a heater or the like that heats a single strand of the core material 18, which is supplied in an elongate solid condition, to a temperature lower than a temperature at which the coating material 20 is plasticized by heating the coating material 20 with the resin material plasticizing device 10. For example, in the case that the core material 18 is made of ABS, the core material 18 may be heated to a temperature of roughly 160° C.

Further, in addition to the core material 18, the core material heating device 22 may be supplied, for example, with three strands of the elongate solid coating material 20. In accordance with this feature, it is possible to supply the coating material 20, which has been preheated using the heat in the core material heating device 22, to the resin material plasticizing device 10, and therefore, the coating material 20 can be heated efficiently. The number of strands of the solid coating material 20 that are supplied is not particularly limited, and can be set appropriately depending on the diameter and volume, etc., of the coating material 20 and the filament 14.

The core material conveying device 24 includes, for example, a pair of drive rollers 36 disposed between the core material heating device 22 and the nozzle 28 in the vicinity of the nozzle 28, and a motor (not shown) for rotating the drive rollers 36. In a state with the core material 18 being sandwiched between the pair of drive rollers 36, the drive rollers 36 are rotated, whereby the core material 18 can be conveyed, so that the core material 18 passes through the core material heating device 22 and is supplied to the nozzle 28. Further, the drive rollers 36 are capable of being rotated in forward and reverse directions, and corresponding to the direction of rotation thereof, the core material 18 can be conveyed while being switched between a direction of being advanced toward the nozzle 28, and in a backward direction away from the nozzle 28.

A pipe 38 which is formed from a heat insulating material is disposed between the core material heating device 22 and the core material conveying device 24. The core material 18 which is discharged from the core material heating device 22 passes through the interior of the externally and thermally insulated pipe 38, and is conveyed to the nozzle 28 while the temperature thereof is maintained.

Each of the coating material conveying devices 26 includes, for example, a pair of drive rollers 40 disposed between the core material heating device 22 and the resin material plasticizing device 10 in the vicinity of the resin material plasticizing device 10, and a motor (not shown) for rotating the drive rollers 40. A number of coating material conveying devices 26 (three in the present embodiment) corresponds to the number of strands of the coating materials 20 that are supplied to the core material heating device 22. The coating materials 20 are conveyed respectively so as to pass through the core material heating device 22, and be supplied to the resin material plasticizing device 10. The drive rollers 40 are capable of being rotated in forward and reverse directions in the same manner as the drive rollers 36, and corresponding to the direction of rotation thereof, the coating materials 20 can be conveyed while being switched between a direction of being advanced toward the resin material plasticizing device 10, and in a backward direction away from the resin material plasticizing device 10.

Pipes 42, which are formed from a heat insulating material in the same manner as the pipe 38, are disposed between the core material heating device 22 and the coating material conveying device 26, in a number corresponding to the number of strands (three in the present embodiment) of the coating material 20 supplied to the core material heating device 22. The coating materials 20 which are discharged from the core material heating device 22 pass through the interior of the externally and thermally insulated pipes 42, and are conveyed to the resin material plasticizing device 10 while the temperature thereof is maintained.

As described above, the resin material plasticizing device 10 according to the present embodiment is supplied with three strands of the coating material 20, which are preheated by the core material heating device 22, in the form of an elongate and solid resin material, and the resin material plasticizing device 10 plasticizes the coating materials 20. In addition, the coating material 20 in a liquid state is discharged to a communicating pipe 44 that communicates with the resin material plasticizing device 10 and the nozzle 28.

Figure 2:
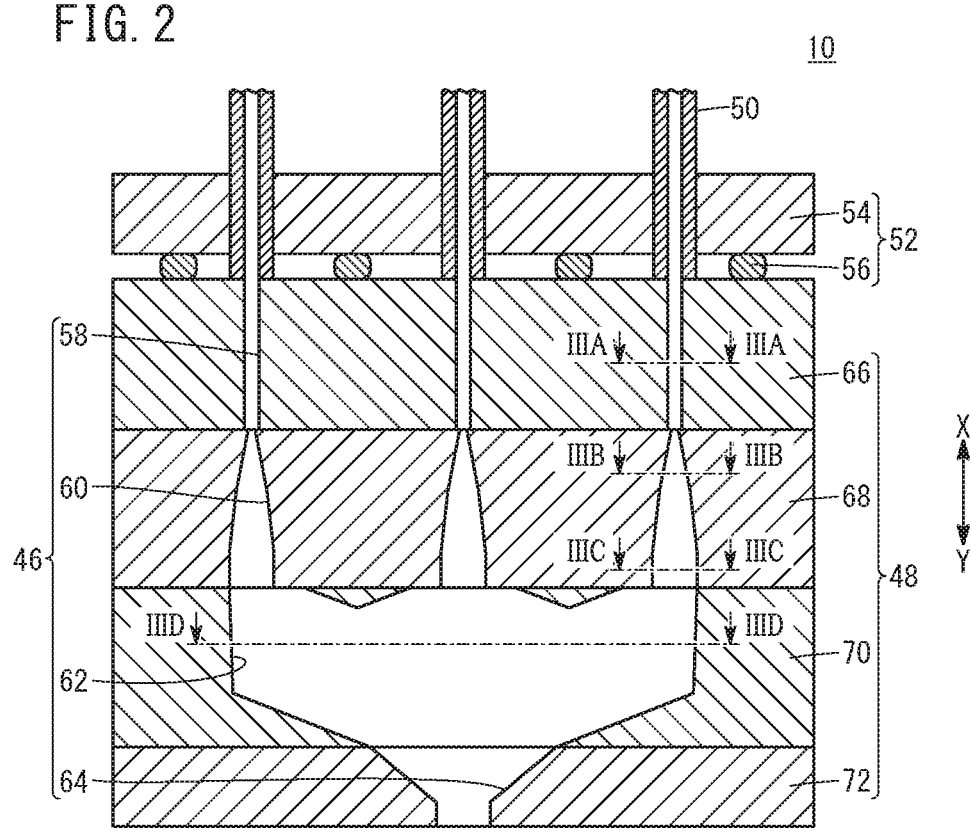
FIG. 2 is a cross-sectional view of the resin material plasticizing device shown in FIG. 1.

More specifically, as shown in FIG. 2, the resin material plasticizing device 10 includes a heating block 48 in which a passage hole 46 is formed through which the coating material 20 is passed, three introduction pipes 50 through which the solid coating material 20 is introduced respectively to the passage hole 46, and heat insulating members 52 disposed between the heating block 48 and the coating material conveying device 26, and which thermally insulate them respectively from each other. In the description that follows, an upstream side of the coating material 20 that passes through the passage hole 46 (the side in the direction of the arrow X in FIG. 2) is also referred to as one end side, and a downstream side (the side in the direction of the arrow Y in FIG. 2) is also referred to as another end side.

The heat insulating members 52 are made up from a heat insulating plate 54 constituted from a heat insulating material, and spacers 56 disposed between the heat insulating plate 54 and the heating block 48. The introduction pipes 50, by being inserted through the heat insulating plate 54, are disposed coaxially with the passage hole 46.

The heating block 48 includes a softening section 66, a plasticizing section 68, a reservoir section 70, and a discharge section 72, in which there are provided, respectively, an upstream portion 58, a midstream portion 60, a reservoir portion 62, and a downstream portion 64 of the passage hole 46. Each of the softening section 66, the plasticizing section 68, the reservoir section 70, and the discharge section 72 is constituted, for example, from a thermally conductive material such as metal or the like, and a heater (not shown) is provided in the interior thereof. By driving the heaters, it is possible to raise the temperatures of the inner wall surfaces of each of the upstream portion 58, the midstream portion 60, the reservoir portion 62, and the downstream portion 64 of the passage hole 46 to desired temperatures, respectively.

More specifically, the softening section 66 is provided with three upstream portions 58 to which the solid coating material 20 is supplied, respectively. Sides on one end of the upstream portions 58 are connected respectively to the introduction pipes 50, and the solid coating material 20 is continuously supplied to the interior of the upstream portions 58 via the introduction pipes 50.

Figure 3A:
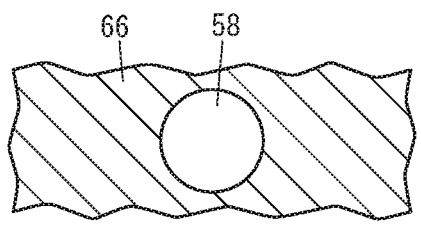
FIG. 3A is a cross-sectional view taken along line IIIA-IIIA of FIG. 2.

In the upstream portions 58, so as to enable the side surfaces of the solid coating material 20 to be kept in contact with the inner wall surfaces of the upstream portions 58, the cross section thereof perpendicular to the axial direction (hereinafter, simply referred to as a cross section) is formed in a shape corresponding to the shape of the cross section of the solid coating material 20 (see FIG. 3A). Moreover, in the present embodiment, the cross-sectional shape of the upstream portions 58 is substantially in the form of a perfect circle, although the invention is not particularly limited to this feature. Further, the inner wall surfaces of the upstream portions 58 are set to a temperature at which the solid coating material 20 can be softened by the heater.

Figure 3B:
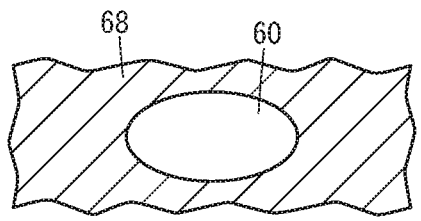
FIG. 3B is a cross-sectional view taken along line IIIB-IIIB of FIG. 2.
Figure 3C:
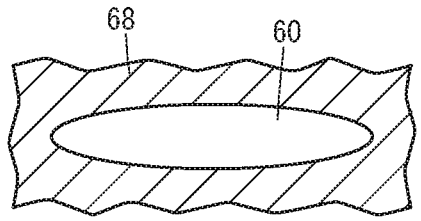
FIG. 3C is a cross-sectional view taken along line IIIC-IIIC of FIG. 2.

In the plasticizing section 68, three midstream portions 60 are provided to which the other end sides of the three upstream portions 58 are connected, respectively. More specifically, the softened coating material 20 is supplied to the interiors of the midstream portions 60 from the one end sides thereof. The inner wall surfaces of the midstream portions 60 are set to a temperature at which the softened coating material 20 is capable of being plasticized by the heater. As shown in FIGS. 3B and 3C, the cross-sectional shape of the midstream portions 60 is set so that, in comparison with the cross-sectional shape of the upstream portions 58, the ratio of the circumferential length with respect to the cross-sectional area thereof (hereinafter simply referred to as the ratio) is greater. In the present embodiment, the cross-sectional shape of the midstream portions 60 is elliptical. Further, the ratio increases progressively from the one end side toward the other end side of the midstream portions 60.

Accordingly, in the midstream portions 60, as the coating material 20 moves from the one end side toward the other end side, the coating material 20 is pressed between the inner wall surfaces of the midstream portions 60 and is made thin, and together therewith, the heat from the wall surfaces is conducted to the interior of the coating material 20. Consequently, the coating material 20 is plasticized and assumes a fluidic state, and the coating material 20 is discharged from the other end side of the midstream portions 60.

Figure 3D:
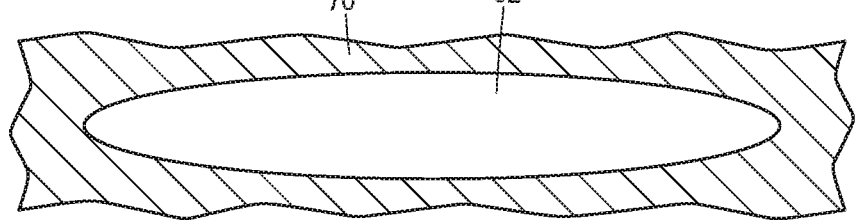
FIG. 3D is a cross-sectional view taken along line IIID-IIID of FIG. 2.

In the reservoir section 70, the reservoir portion 62 is formed in which the plasticized coating material 20, which is discharged from the other end sides of the three midstream portions 60, is merged together and temporarily stored. The inner wall surface of the reservoir portion 62 is set to a temperature at which the coating material 20 can be maintained at a desired plasticizing temperature by the heater. As shown in FIG. 3D, from the standpoint of efficiently conducting heat to the coating material 20, the cross-sectional shape on at least the one end side of the reservoir portion 62 preferably has a ratio that is greater than that of the cross-sectional shape of the upstream portions 58.

Further, in the reservoir portion 62, the amount of coating material 20 discharged per unit time from the other end side thereof with respect to the downstream portion 64 is smaller than the amount of coating material 20 supplied per unit time from the one end side. Therefore, while the coating material 20 passes through the passage hole 46, the plasticized coating material 20 can be easily stored in the reservoir portion 62.

In the discharge section 72, the downstream portion 64 is formed, to which the coating material 20 stored in the reservoir portion 62 is supplied from the one end side thereof, and the coating material 20 is discharged from the other end side thereof. The temperature of the inner wall surface of the downstream portion 64, similar to the reservoir portion 62, is set so as to be capable of maintaining the coating material 20 at a desired plasticizing temperature by the heater.

Moreover, for example, in the downstream portion 64, the cross section of the other end side thereof that is connected to the communicating pipe 44 is formed in a shape corresponding to the cross section of the communicating pipe 44, for example, a substantially perfect circular shape, whereby the coating material 20 can be smoothly discharged into the communicating pipe 44.

Figure 4:
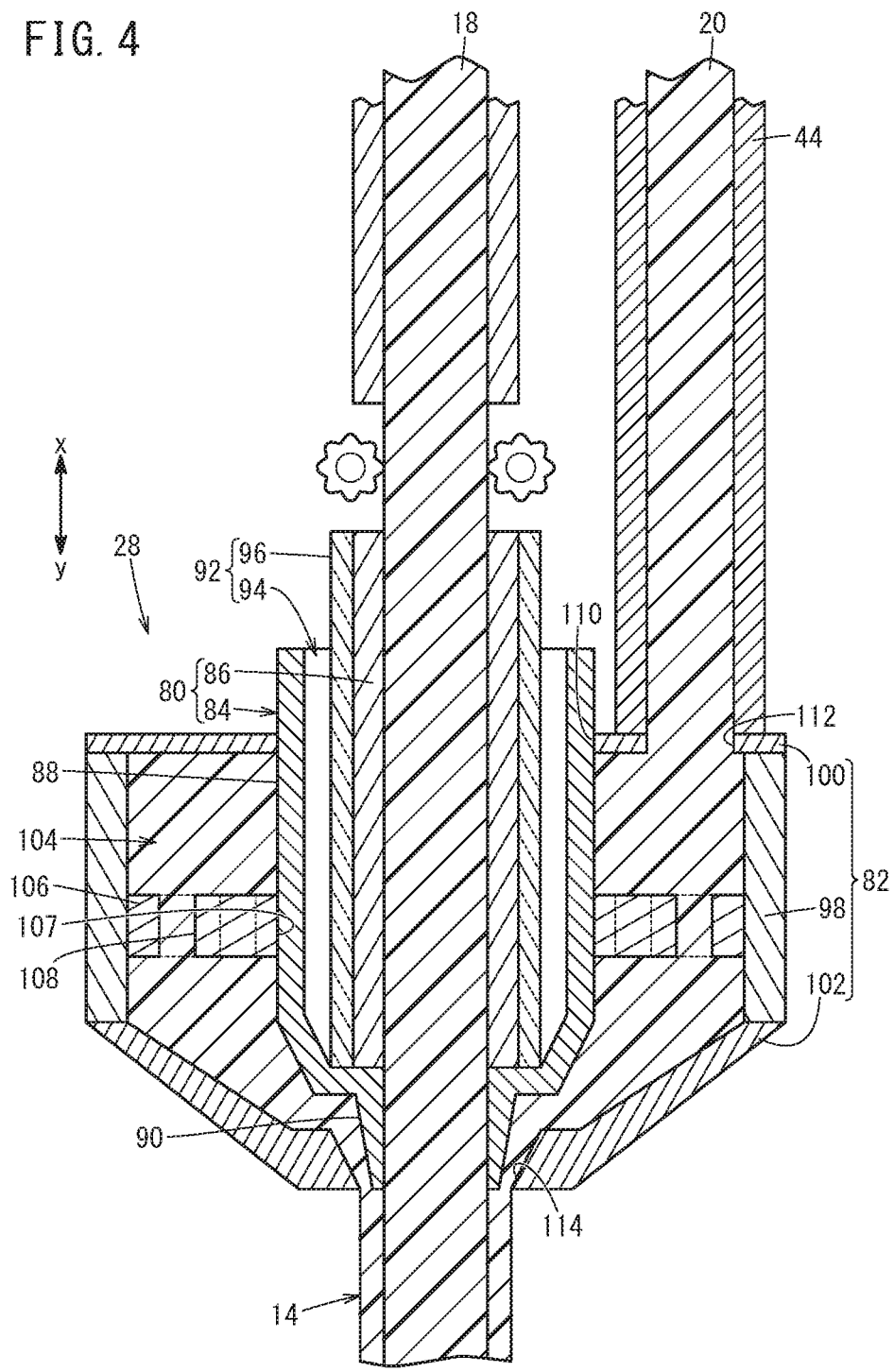
FIG. 4 is a cross-sectional view of a nozzle of the three-dimensional printing apparatus shown in FIG. 1.

As shown in FIGS. 1 and 4, the nozzle 28 discharges the filament 14 toward the stage 16. More specifically, the nozzle 28 includes a core material discharge member 80 through which the core material 18 heated by the core material heating device 22 is discharged, and a coating material discharge member 82 through which the coating material 20, which has been plasticized by the resin material plasticizing device 10, is discharged.

The core material discharge member 80 has a main pipe 84 and a heat insulating pipe 86. The main pipe 84 includes a large diameter portion 88 provided on a proximal end side (the side in the direction of the arrow x in FIG. 4) to which the core material 18 is supplied, and a small diameter portion 90, which is provided on a distal end side (the side in the direction of the arrow y in FIG. 4) that discharges the core material 18, and is smaller in diameter than the large diameter portion 88. The distal end side of the large diameter portion 88 is tapered in diameter toward the small diameter portion 90. Further, a step is formed between the distal end of the large diameter portion 88 and the proximal end of the small diameter portion 90, on the basis of a mutual diametrical difference therebetween.

The heat insulating pipe 86 is formed from a heat insulating material, and the inner diameter thereof is substantially equivalent to the inner diameter of the small diameter portion 90 of the main pipe 84, whereas the outer diameter thereof is smaller than the inner diameter of the large diameter portion 88. As described above, the heat insulating pipe 86 is disposed inside the large diameter portion 88, so that an end surface on the distal end side thereof abuts against the stepped surface formed between the large diameter portion 88 and the small diameter portion 90.

A heat shielding portion 92 is provided between the main pipe 84 and the heat insulating pipe 86. The heat shielding portion 92 is constituted from a space 94 formed between the large diameter portion 88 and the heat insulating pipe 86, and a heat insulating material 96 or the like provided in the space 94, and which functions to provide heat shielding between the interior and the exterior of the core material discharge member 80. Further, the heat shielding portion 92 may further include, for example, a coolant circulating mechanism (not shown), which enables a coolant such as air or the like to flow through the space 94. In this case, it is possible to more suitably provide heat shielding between the interior and the exterior of the core material discharge member 80.

The coating material discharge member 82 includes a reservoir tube 98, a lid member 100 that closes an opening on a proximal end side of the reservoir tube 98, and a tapered portion 102 disposed on the distal end side of the reservoir tube 98.

The reservoir tube 98 is formed of a heat insulating material. An inner diameter of the reservoir tube 98 is larger than the outer diameter of the large diameter portion 88 of the main pipe 84, and is arranged so as to cover an outer circumferential surface excluding a portion on the proximal end side of the large diameter portion 88. More specifically, between the inner circumferential surface of the reservoir tube 98 and the outer circumferential surface of the large diameter portion 88, a nozzle reservoir portion 104 is formed in which the plasticized coating material 20 is capable of being stored.

As shown in FIG. 4, a disk member 106 may be disposed in the nozzle reservoir portion 104. The disk member 106 is formed with an insertion hole 107 through which the main pipe 84 is inserted substantially in the center in a diametrical direction, together with a plurality of through holes 108 that penetrate along the thickness direction more on an outer circumferential side than the insertion hole 107. The plasticized coating material 20 flows via the through holes 108 from the proximal end side toward the distal end side of the nozzle reservoir portion 104, whereby the pressure and temperature of the coating material 20 can be equalized.

The lid member 100 is formed with an insertion hole 110 through which a proximal end side of the main pipe 84 is inserted substantially in the center in a diametrical direction, together with a supply port 112 to which the communicating pipe 44 is connected more on an outer circumferential side than the insertion hole 110. The plasticized coating material 20 is supplied to the nozzle reservoir portion 104 via the supply port 112.

The tapered portion 102 extends from the reservoir tube 98 while becoming reduced in diameter toward the distal end side. A discharge port 114, which is capable of discharging the coating material 20 inside the nozzle reservoir portion 104, is formed at the distal end of the tapered portion 102. The inner diameter of the discharge port 114 is greater than the outer diameter of the distal end side of the small diameter portion 90, and the distal end side of the small diameter portion 90 is disposed inside the discharge port 114.

More specifically, the nozzle 28, which is configured in the manner described above, discharges the core material 18 having a lower temperature than the plasticized coating material 20 from the distal end side of the small diameter portion 90, and together therewith, discharges the plasticized coating material 20 from the discharge port 114 of the tapered portion 102. Owing thereto, the filament 14 having the coating material 20 adhered to the outer circumferential surface of the core material 18 is formed, and is capable of being discharged.

Further, as described above, in the nozzle 28, the core material discharge member 80 is disposed inside the coating material discharge member 82. Therefore, for example, compared with a case in which the core material discharge member 80 and the coating material discharge member 82 are arranged side by side, it is possible to reduce the size of the nozzle 28. Thus, it is possible to reduce the size and scale of the three-dimensional printing apparatus 12 as a whole.

In the case that the filament 14 is continuously discharged from the nozzle 28, the respective drive rollers 36, 40 of the core material conveying device 24 and the coating material conveying device 26 may be continuously rotated in one direction. On the other hand, in the case that discharging of the filament 14 from the nozzle 28 is to be halted, rotation of the respective drive rollers 36, 40 may be stopped. In this case, concerning the drive rollers 40 of the coating material conveying device 26, by temporarily rotating the drive rollers 40 in the other direction and then stopping them, any concern over the plasticized coating material 20 being excessively discharged from the coating material discharge member 82 can be dispensed with. In addition, the nozzle 28 may be provided with a freely openable and closeable lid (not shown), which closes both the distal end side of the small diameter portion 90 and the discharge port 114, or only the discharge port 114.

As shown schematically using the symbolic diagram of FIG. 5, the moving device 30 includes a robot 120 and a control unit (not shown). The robot 120 includes a main body portion 122 operated on the basis of a three-dimensional orthogonal coordinate system, and an articulated arm 124 attached to the main body portion 122. The arm 124 comprises a first joint 128 and a second joint 130 provided in this order from a proximal end toward a distal wrist 126 of the arm 124. The core material conveying device 24, the coating material conveying device 26, the resin material plasticizing device 10, and the nozzle 28 (the constituent elements surrounded by the two-dot-dashed line in FIG. 1, referred to collectively as the nozzle 28, etc.) are fixed to the wrist 126.

By driving the robot 120 under the control of the control unit, the moving device 30 is capable of moving the nozzle 28, etc., in three dimensions with respect to the stage 16. At this time, because the nozzle 28 is reduced in size and scale as described above, it is possible to easily move the nozzle 28, etc., with high accuracy by the moving device 30.

The three-dimensional printing apparatus 12 equipped with the resin material plasticizing device 10 according to the present embodiment is basically configured in the manner described above. More specifically, the resin material plasticizing device 10, which is applied to the three-dimensional printing apparatus 12, is capable of supplying the plasticized coating material 20 to the nozzle 28 in order to form the filament 14. Hereinafter, a resin material plasticizing method according to the present embodiment will be described in relation to operations of the three-dimensional printing apparatus 12 including operations of the resin material plasticizing device 10.

With the three-dimensional printing apparatus 12, by driving the core material conveying device 24 and the coating material conveying device 26, the elongate solid core material 18 and the coating material 20 are continuously supplied to the core material heating device 22. Consequently, the core material 18 and the coating material 20 are heated to a temperature lower than the temperature at which the coating material 20 is plasticized by heating the coating material 20 with the resin material plasticizing device 10.

Among the coating material 20 and the core material 18 which have been heated by the core material heating device 22, the coating material 20 is supplied to the introduction pipes 50 of the resin material plasticizing device 10 via the pipes 42.

In the resin material plasticizing device 10, the softening section 66, the plasticizing section 68, the reservoir section 70, and the discharge section 72 of the heating block 48 are each heated by the heaters therein to the aforementioned predetermined temperatures. The solid coating material 20 supplied to the introduction pipes 50 is initially supplied into the upstream portions 58 of the passage hole 46, and moves in the upstream portions 58 toward the other end sides thereof. At this time, as described above, the cross section of the upstream portions 58 is of a shape corresponding to the cross section of the solid coating material 20 contained therein. Therefore, the heated inner wall surfaces of the upstream portions 58 and the side surfaces of the solid coating material 20 can be brought into contact with each other in order to efficiently carry out heat exchange therebetween, thereby enabling the coating material 20 to be quickly softened. Stated otherwise, the softening step of the resin material plasticizing method according to the present embodiment is performed.

The coating material 20, which has been softened in the upstream portions 58, is supplied to the midstream portions 60, and by moving along the midstream portions 60 toward the other end sides, the coating material 20 is plasticized while becoming thin. Stated otherwise, the plasticizing step of the resin material plasticizing method according to the present embodiment is performed. With the thin coating material 20, heat from the inner wall surface of the midstream portions 60 can be thermally conducted rapidly to the entirety of the coating material 20 including the interior thereof. Therefore, for example, plasticizing efficiency can be enhanced, as compared to a case in which a coating material 20 of the same volume but having a perfectly circular cross-sectional shape is heated and plasticized.

Further, as noted above, the ratio of the cross-sectional shape of the midstream portion 60 increases progressively from one end side toward the other end side of the midstream portion 60. In the midstream portion 60, as the coating material 20 moves from the one end side toward the other end side, the heating time becomes longer and deformation is facilitated. Therefore, by setting the ratio of the cross-sectional shape of the midstream portion 60 in the manner described above, it is possible to smoothly make the coating material 20 thin. In this manner, as the coating material 20 becomes thin, as described above, it is possible for heat to be promptly conducted to the interior of the coating material 20, and thus the plasticizing efficiency can be further enhanced.

As described above, the coating material 20 is plasticized in each of the three midstream portions 60, and is merged together by being supplied into the reservoir portion 62. In accordance with this feature, the resin material stored in the reservoir portion 62 is discharged from the downstream portion 64. Stated otherwise, the discharging step of the resin material plasticizing method according to the present embodiment is performed.

In this manner, by temporarily storing the coating material 20 in the reservoir portion 62 prior to discharging the coating material 20, the entirety of the coating material 20 can be uniformly set to a desired temperature inside the reservoir portion 62. Consequently, it becomes possible to stably discharge the coating material 20 which has been suitably plasticized.

As described above, in accordance with the resin material plasticizing device 10 and the resin material plasticizing method according to the present embodiment, without increasing the size of the resin material plasticizing device 10, or stated otherwise, while the resin material plasticizing device 10 is kept small in scale, it is possible to thermally conduct heat rapidly to the interior of the coating material 20, as well as to enhance the plasticizing efficiency of the coating material 20.

The coating material 20, which is discharged from the resin material plasticizing device 10 into the communicating pipe 44, is supplied to the coating material discharge member 82 of the nozzle 28, and is stored in the nozzle reservoir portion 104.

On the other hand, the core material 18 is supplied to the core material discharge member 80 of the nozzle 28 via the pipe 38. In the core material discharge member 80, the core material 18 passes through the interior of the heat insulating pipe 86 of the core material discharge member 80, which is thermally insulated from the exterior by the heat shielding portion 92, etc. Therefore, as described above, in the nozzle reservoir portion 104, which is formed between the outer circumferential surface of the main pipe 84 of the core material discharge member 80 and the inner circumferential surface of the reservoir tube 98 of the coating material discharge member 82, it is possible to suppress the heat of the coating material 20 from being transferred to the core material 18, even if the plasticized coating material 20 having a high temperature is stored.

Therefore, the core material discharge member 80 discharges the core material 18, which is lower in temperature than the plasticized coating material 20, from the small diameter portion 90. On the other hand, in the coating material discharge member 82, the plasticized coating material 20 is discharged from the discharge port 114 of the tapered portion 102, and the coating material 20 is adhered to the outer circumferential surface of the core material 18 that is discharged from the small diameter portion 90. Consequently, at the nozzle 28, the filament 14 is formed and discharged, which is made up from the plasticized coating material 20 and the core material 18 that is plastically deformable but to a lower temperature than the plasticized coating material 20.

Moreover, the core material 18, which is of a temperature lower than the plasticized coating material 20, may be made to reach a temperature at which plastic deformation thereof is possible at a stage prior to the coating material 20 being adhered thereto, or stated otherwise, by being heated in the core material heating device 22. Alternatively, the core material 18 may be made to reach a temperature at which plastic deformation thereof is possible by depositing the plasticized coating material 20 thereon and conducting heat therefrom. More specifically, before and immediately after the coating material 20 is adhered to the core material 18, the temperature of the core material 18 may or may not have reached the temperature at which plastic deformation thereof is possible. When the filament 14 is laminated onto a portion to be laminated, it is sufficient insofar as the core material 18 that constitutes the filament 14 is of a temperature at which plastic deformation thereof is possible even while being at a lower temperature than that of the plasticized coating material 20.

In the foregoing manner, by the filament 14 being discharged from the nozzle 28, and by the nozzle 28, etc., being moved in three dimensions by the moving device 30, the filament 14 can be laminated while being pressed against the portion to be laminated on the stage 16.

As to the portion to be laminated, in the case that the filament 14, which is discharged from the nozzle 28, is the first layer that is to be stacked on the stage 16, the portion to be laminated is placed at a predetermined position of the stage 16. Further, in the case that the filament 14, which is discharged from the nozzle 28, is a second or subsequent layer to be stacked on the previously laminated filament 14, the portion to be laminated is placed at a predetermined position of the previously laminated filament 14.

FIGS. 6A to 6C are explanatory diagrams for explaining the process of laminating and integrating the filaments 14, and more specifically, are cross-sectional views showing a previously laminated filament 14a, and a filament 14b for which a portion to be laminated is on the filament 14a.

As shown in FIG. 6A, the filament 14b immediately after being discharged from the nozzle 28 is in a state in which the plasticized coating material 20b is adhered to the outer circumferential surface of the core material 18b, which is at a lower temperature than that of the coating material 20b. As shown in FIG. 6B, when the filament 14b is pressed and laminated with respect to the previously laminated filament 14a, the coating material 20b flows so as to fill the space between the filament 14b and the filament 14a. In this state, by the coating material 20b becoming solidified, as shown in FIG. 6C, the filament 14a and the filament 14b can be integrated via the coating materials 20a, 20b.

Moreover, in FIGS. 6A to 6C, an aspect is shown in which the filaments 14a, 14b, which are of a state in which the core materials 18a, 18b and the coating materials 20a, 20b are disposed so as to be concentric with each other, or in other words, a state in which the coating materials 20a, 20b are adhered with a substantially uniform thickness in the circumferential direction around the entire outer circumferential surface of the core materials 18a, 18b, are laminated on each other and integrated. However, it is a matter of course that the relative positioning of the coating materials 20a, 20b with respect to the core materials 18a, 18b, as well as the shape of the coating materials 20a, 20b may assume various forms, depending on the gravity applied to the filaments 14a, 14b, the viscosity of the plasticized coating materials 20a, 20b, and the like. The filament 14a and the filament 14b can be integrated together by at least allowing the coating material 20b to become solidified, in a state in which the coating material 20b is interposed between the core material 18a and the core material 18b.

In this manner, a three-dimensional object can be obtained by stacking all of the necessary amount of the filaments 14, including the filaments 14a, 14b, so as to form a desired shape, and then allowing the filaments 14 to solidify.

As described above, according to the three-dimensional printing apparatus 12, for example, in comparison with a case in which plasticized filaments, all of which have been heated to a uniform temperature, are laminated and solidified, the core material 18b is kept at a low temperature, or in other words, only the coating material 20b is heated to a high temperature, and therefore, by such an amount, it is possible for the filament 14b to become solidified more rapidly. On the other hand, since the coating material 20b can be sufficiently heated and plasticized, the coating material 20b can be integrated suitably with the adjacent filament 14a. Stated otherwise, it is possible to shorten the time required for the filament 14b to solidify, while avoiding a deterioration in the adhesiveness between the filaments 14a, 14b.

As a result, solidification of the filament 14b easily follows with the speed at which the nozzle 28 is moved, and all of the filaments 14, including the filaments 14a, 14b, can be laminated in a desired shape. In addition, during the period until the filaments 14 become solidified following lamination thereof, it is possible to suppress the occurrence of deformations such as deflection and sagging. Furthermore, as described above, the amount of the plasticized portion that is heated to a high temperature can be reduced, and by this portion, the amount by which the filament 14 undergoes contraction due to solidification thereof can be reduced.

Accordingly, with the three-dimensional printing apparatus 12, a three-dimensional object, which is superior both in terms of manufacturing efficiency and molding accuracy, can be obtained. At this time, as described above, by heating the core material 18 by the core material heating device 22, the filament 14 having the core material 18 of a temperature which is lower than that of the plasticized coating material 20 and at which the core material 18 is capable of being plastically deformed, can be efficiently obtained. In this manner, by increasing the temperature of the core material 18, it is possible for the filament 14 to be laminated while easily undergoing deformation. In addition, even if the filament 14 is deformed, it is possible to avoid distortion or strain from remaining in the interior of the filament 14.

By applying the resin material plasticizing device 10 according to the present embodiment to the three-dimensional printing apparatus 12, it is possible to further improve manufacturing efficiency and molding accuracy of three-dimensional objects obtained by the three-dimensional printing apparatus 12. More specifically, as described above, with the resin material plasticizing device 10, it is possible for the solid coating material 20 to be plasticized rapidly, and therefore, it is possible to improve the efficiency with which the filament 14 is formed by the three-dimensional printing apparatus 12, and hence it is possible to improve the manufacturing efficiency of three-dimensional objects.

Further, since the resin material plasticizing device 10 can be reduced in size and scale, the resin material plasticizing device 10 can be easily transported together with the nozzle 28, etc., by the moving device 30. Consequently, it is possible to improve the accuracy with which the filaments 14 are laminated, and hence to enhance the molding accuracy of three-dimensional objects.

The present invention is not particularly limited to the above-described embodiments, and various modifications are possible without departing from the essence and gist of the present invention.

In the resin material plasticizing device 10 and the resin material plasticizing method according to the above embodiments, the passage hole 46 includes three of the upstream portions 58 and the midstream portions 60. However, the upstream portion 58 and the midstream portion 60 may be provided as one each, or may be provided in a number other than three. Further, the passage hole 46 need not necessarily include the reservoir portion 62.

Further, in the resin material plasticizing device 10 and the resin material plasticizing method according to the above embodiments, in order to rapidly conduct heat to the entirety of the coating material 20 including the interior thereof, the coating material 20 is deformed so as to be made thin (so as to increase the ratio) in the midstream portions 60. However, the present invention is not particularly limited to this feature.

For example, as will be described later, the coating material 20 may be deformed in order to increase the time during which the coating material 20 remains in the passage hole 46, using a resin material plasticizing device 140 shown in FIGS. 7A to 7D, or a resin material plasticizing device 150 shown in FIGS. 8A to 8D. Among the constituent elements shown in FIGS. 7A to 7D and FIGS. 8A to 8D, elements thereof having the same or similar functions and effects as those shown in FIG. 2 are denoted with the same reference numerals, and detailed description of such features is omitted.

As shown in FIGS. 7A to 7D, the resin material plasticizing device 140 is constituted in substantially the same manner as the resin material plasticizing device 10, except that it is not equipped with the reservoir portion 62 (reservoir section 70), a midstream portion 142 is provided instead of the midstream portion 60, and a downstream portion 144 is provided instead of the downstream portion 64.

The cross section of the midstream portion 142, for example, is formed in an elliptical shape, so that the ratio becomes greater in comparison with the cross section of the upstream portion 58. Further, from the one end side of the midstream portion 142 to another end side thereof, the cross section of the midstream portion 142 is of substantially the same shape.

The cross section of the downstream portion 144 is set so that the ratio and the area thereof are greater in comparison with those of the cross section of the upstream portion 58. Further, the ratio and the area of the cross section of the downstream portion 144 increase progressively from the one end side toward another end side of the downstream portion 144.

Accordingly, the coating material 20, which is softened in the upstream portion 58, passes through the midstream portion 142 and the downstream portion 144 while undergoing deformation. At this time, by setting the ratio in the manner described above, the coating material 20 more easily receives (is more susceptible to) resistance from the inner wall surfaces of the midstream portion 142 and the downstream portion 144, than from the inner wall surface of the upstream portion 58. Therefore, the speed at which the coating material 20 passes through the midstream portion 142, and the speed at which the coating material 20 passes through the downstream portion 144 are smaller in comparison with the speed at which the coating material 20 passes through the upstream portion 58.

Furthermore, by setting the cross-sectional areas in the manner described above, the speed at which the coating material 20 passes through the downstream portion 144 becomes even less than the speed at which the coating material 20 passes through the upstream portion 58.

As a result, it is possible to reduce the speed at which the coating material 20 is discharged from the passage hole 46, and to be lower than the speed at which the coating material 20 is supplied to the passage hole 46. Stated otherwise, it is possible to increase the time during which the coating material 20 remains in the passage hole 46, or in other words, to increase the time during which the coating material 20 is heated by being brought into contact with the inner wall surface of the passage hole 46.

As described above, in accordance with the resin material plasticizing device 140 according to the present embodiment, without increasing the size of the device 140, it is possible to thermally conduct heat suitably to the interior of the coating material 20, as well as to enhance the plasticizing efficiency of the coating material 20.

As shown in FIGS. 8A to 8D, the resin material plasticizing device 150 is constituted in substantially the same manner as the resin material plasticizing device 10, except that it is not equipped with the reservoir portion 62 (reservoir section 70), a midstream portion 152 is provided instead of the midstream portion 60, and a downstream portion 154 is provided instead of the downstream portion 64.

The cross section of the midstream portion 152, for example, is of an elliptical shape, and is set so that the ratio and the cross-sectional area thereof are greater in comparison with those of the cross section of the upstream portion 58. Further, the ratio and the area of the cross section of the midstream portion 152 increase progressively from the one end side toward another end side of the midstream portion 152.

The cross section of the downstream portion 154, for example, is of an elliptical shape, and is set so that the ratio and the area thereof are greater in comparison with those of the cross section of the upstream portion 58. Further, the ratio and the area of the cross section of the downstream portion 154 become smaller progressively from the one end side toward another end side of the downstream portion 154.

More specifically, in the resin material plasticizing device 150 as well, in the same manner as the resin material plasticizing device 140, the cross-sectional shape of the passage hole 46 is set in a manner so that the speed at which the coating material 20 passes through the other end side (downstream side) from the upstream portion 58 is less than the speed at which the coating material 20 passes through the upstream portion 58.

Therefore, in accordance with the resin material plasticizing device 150 according to the present embodiment as well, without increasing the size of the device 150, it is possible to thermally conduct heat suitably to the interior of the coating material 20, as well as to enhance the plasticizing efficiency of the coating material 20.

With the resin material plasticizing device 10 according to the above-described embodiment, as shown in FIGS. 3B and 3C, the cross-sectional shape of the midstream portion 60 is elliptical. However, the present invention is not particularly limited to this feature, and the cross-sectional shape of the midstream portion 60 may be formed in any manner insofar as the ratio thereof is greater than the same ratio of the cross section of the upstream portion 58. Further, the cross-sectional shape may be constant from the one end side to the other end side of the midstream portion 60, or the cross-sectional shape may be changed with a gradient that differs from those shown in FIGS. 2, 3B and 3C.

Similarly, with the resin material plasticizing devices 140, 150 according to the above-described embodiments, as shown in FIGS. 7A to 7D and FIGS. 8A to 8D, concerning both the midstream portions 142, 152 and the downstream portions 144, 154, the cross-sectional shapes thereof were set in a manner so that the coating material 20 passes therethrough at a speed which is lower than in the upstream portion 58. Further, the cross-sectional shapes of each of the midstream portions 142, 152 and the downstream portions 144, 154 were formed in elliptical shapes. However, the present invention is not particularly limited to this feature.

The cross-sectional shapes may be set so that at least a part of at least one of the midstream portion 142 (or 152) and the downstream portion 144 (or 154) enables the coating material 20 to pass therethrough at a speed which is lower than that of the upstream portion 58. Further, the cross-sectional shapes may be constant from the one end side to the other end side of the midstream portions 142, 152 and the downstream portions 144, 154, or the cross-sectional shapes may be changed with a gradient that differs from those shown in FIGS. 7A and 8A.

Concerning the cross-sections of the midstream portions 60, 142, 152 and the downstream portions 144, 154 in the resin material plasticizing devices 10, 140, 150, the shapes shown in FIGS. 9A to 9D can be offered as other examples which enable the aforementioned ratio to increase more so than the cross section of the upstream portion 58. However, it is a matter of course that the present invention is not limited to such shapes.

Figure 9A:
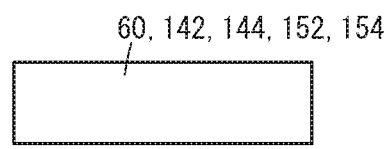
FIGS. 9A to 9D are cross-sectional views of passage holes of a resin material plasticizing device according to still another embodiment of the present invention.
Figure 9B:
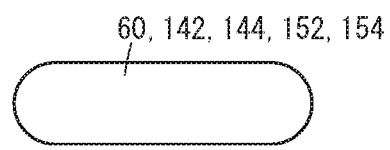
Figure 9C:
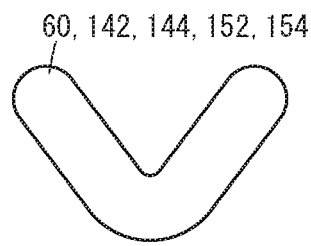
Figure 9D:
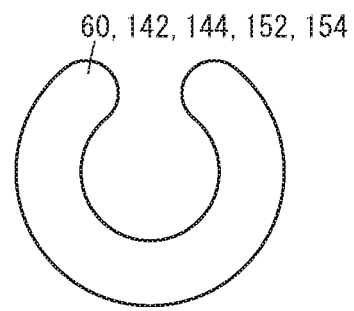

More specifically, the cross sections of the midstream portions 60, 142, 152 and the downstream portions 144, 154 may be rectangular as shown in FIG. 9A, or such a rectangular shape may be formed with rounded corners as shown in FIG. 9B. Further, the shapes thereof may be substantially V-shaped (see FIG. 9C) or substantially C-shaped (see FIG. 9D) as viewed in the axial direction. Furthermore, aside from these shapes, the shapes thereof may be substantially O-shaped as viewed in the axial direction.

Further, in the resin material plasticizing devices 10, 140, 150 and the resin material plasticizing method according to the above-described embodiments, the coating material 20 which makes up part of the filament 14 is plasticized. However, the invention is not particularly limited to this feature, and for example, the entire filament, which is used in shaping a three-dimensional object by a three-dimensional printing method, may be plasticized.

Moreover, with the three-dimensional printing apparatus 12, by the coating material 20 being adhered to the entire outer circumferential surface of the core material 18 with a substantially uniform thickness in the circumferential direction, the filament 14 is formed in which the cylindrical core material 18 and the annular coating material 20 are arranged concentrically. However, the filament 14 may be formed by the coating material 20 being adhered only to a portion of the outer circumferential surface of the core material 18, or the filament 14 may be formed in a manner so that the cylindrical core material 18 and the annular coating material 20 are arranged eccentrically.

Further, although the moving device 30 is equipped with the robot 120 as shown in FIG. 5, the moving device 30 is not particularly limited, and insofar as it is capable of moving the nozzle 28, etc., in three dimensions with respect to the stage 16, a variety of configurations can be adopted therefor.

What is claimed is:

1. A heating block of a resin material plasticizing device, the heating block comprising a passage hole to which there is supplied an elongate solid resin material, wherein the heating block is capable of raising temperature of an inner wall surface of the passage hole, wherein the solid resin material is heated in interior of the passage hole and is discharged in a plasticized state;

the passage hole comprising:
   an upstream portion to which the solid resin material is configured to be supplied;
   a midstream portion to which the resin material, which has been heated and softened in the upstream portion, is configured to be supplied; and
   a downstream portion to which the resin material, which has been heated and plasticized in the midstream portion, is configured to be supplied from one end side thereof, and the resin material is discharged from another end side thereof;
   wherein, in the upstream portion, so that an inner wall surface thereof is kept in contact with a side surface of the solid resin material, a cross section perpendicular to an axial direction thereof has a shape corresponding to a cross-sectional shape perpendicular to an axial direction of the solid resin material; and
   in at least a part of the midstream portion, a ratio of a circumferential length with respect to a cross-sectional area of a cross section perpendicular to an axial direction is greater than a ratio of the upstream portion.

2. The heating block according to claim 1, wherein, in the midstream portion, the ratio becomes greater progressively from a side of the upstream portion toward a side of the downstream portion.

3. The heating block according to claim 1, wherein the upstream portion and the midstream portion are provided in plurality respectively, the passage hole further comprising a reservoir portion, which is interposed between the plurality of the midstream portions and the downstream portion, and in which the resin material, which was plasticized in the plurality of the midstream portions, is merged together and stored.

\* \* \* \* \*